United States Patent
Gkortsas et al.

(10) Patent No.: US 11,841,476 B2
(45) Date of Patent: Dec. 12, 2023

(54) METHODS AND SYSTEMS OF DETERMINING PARAMETERS CHARACTERIZING POROUS MEDIA FROM DATA GATHERED BY A PLURALITY OF DIFFERENT TOOLS

(71) Applicant: SCHLUMBERGER TECHNOLOGY CORPORATION, Sugar Land, TX (US)

(72) Inventors: Vasileios-Marios Gkortsas, Boston, MA (US); Lalitha Venkataramanan, Lexington, MA (US); Jean-Marc Donadille, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 831 days.

(21) Appl. No.: 16/495,389

(22) PCT Filed: Mar. 27, 2018

(86) PCT No.: PCT/US2018/024415
§ 371 (c)(1),
(2) Date: Sep. 19, 2019

(87) PCT Pub. No.: WO2018/183223
PCT Pub. Date: Oct. 4, 2018

(65) Prior Publication Data
US 2020/0110191 A1    Apr. 9, 2020

Related U.S. Application Data

(60) Provisional application No. 62/476,902, filed on Mar. 27, 2017.

(51) Int. Cl.
*G01V 3/38*    (2006.01)
*G01V 3/22*    (2006.01)
(Continued)

(52) U.S. Cl.
CPC .................. *G01V 3/22* (2013.01); *G01V 3/32* (2013.01); *G01V 3/34* (2013.01)

(58) Field of Classification Search
CPC ............... G01V 3/22; G01V 3/32; G01V 3/34
See application file for complete search history.

(56) References Cited

U.S. PATENT DOCUMENTS 5,675,147 A * 10/1997 Ekstrom ................. G01V 11/00
250/261
8,364,404 B2 * 1/2013 Legendre ................. G01V 1/50
702/10
(Continued)

OTHER PUBLICATIONS

D. Rankin and R.P. Singh, "Effect of Clay and Salinity on the Dielectric Properties of Rock," Sep. 10, 1985, Journal of Geophysical Resarch, vol. 90, No. B10, pp. 8793-8800. (Year: 1985).*

(Continued)

*Primary Examiner* — Mohammad K Islam
*Assistant Examiner* — Christine Y Liao
(74) *Attorney, Agent, or Firm* — Jeffrey D. Frantz

(57) ABSTRACT

Methods are provided for determining values for a set of parameters for multiple locations in a formation by inversion of formation data obtained from a plurality of different logging tools. The inversion of the formation data is constrained by certain formation data that characterizes each particular location in the formation as obtained from at least one of the plurality of different logging tools. In one embodiment, the set of parameters for each particular location in the formation includes an apparent cementation factor $m_n$ and a formation water saturation $S_w$, which can be derived by inverting dielectric data that characterizes the particular location in the formation as obtained from a dielectric logging tool. The methods can also be adapted to (Continued)

characterize a porous medium such as reservoir rock, particular with regard to laboratory analysis of porous media samples.

33 Claims, 8 Drawing Sheets

(51) Int. Cl.
*G01V 3/32* (2006.01)
*G01V 3/34* (2006.01)

(56) References Cited

U.S. PATENT DOCUMENTS

| | | | |
|---|---|---|---|
| 9,720,124 B2* | 8/2017 | Kadayam Viswanathan | ............... G01N 24/081 |
| 10,393,641 B2* | 8/2019 | Donadille | ................ G01V 3/06 |
| 10,502,863 B2* | 12/2019 | Mosse | .................. G01V 99/005 |
| 2009/0015254 A1 | 1/2009 | Castillo et al. | |
| 2009/0206834 A1* | 8/2009 | Minh | ....................... G01V 3/32 324/303 |
| 2012/0192640 A1 | 8/2012 | Minh et al. | |
| 2013/0002258 A1* | 1/2013 | Ligneul | .................. E21B 47/06 324/376 |
| 2013/0204534 A1 | 8/2013 | Anand et al. | |
| 2016/0097876 A1 | 4/2016 | Freed et al. | |
| 2016/0230548 A1 | 8/2016 | Gzara et al. | |

OTHER PUBLICATIONS

Vasileios-Marios Gkortsas, Lalitha Venkataramanan, T. S. Ramakrishnan, and Denise Freed, "Indication of wettability from dielectric measurements on partially saturated rocks using effective medium models" Sep. 2015, Geophysics, vol. 80, No. 5, pp. E258-E265. (Year: 2015).*

G.M. Hamada, M.N.J. Al-Awad and A.A. Alsughayer, "Water Saturation Computation from Laboratory,3D Regression", Oil & Gas Science and Technology, vol. 57, No. 6, pp. 637-651. (Year: 2002).*

Abdel aal, A. F. et al., "Integration of Dielectric Dispersion and 3D NMR Characterizes the Texture and Wettability of a Cretaceous Carbonate Reservoir", SPE 164150, presented at the SPE Middle East Oil and Gas Show and Conference, Manama, Bahrain, 2013, 12 pages.

Feng, S. et al., "Geometrical model of conductive and dielectric properties of partially saturated rocks", Journal of Applied Physics, 1985, 58, pp. 3236-3243.

Mendelson, K. S. et al, "The effect of grain anisotropy on the electrical properties of sedimentary rocks", Geophysics, 1982, 47(2), pp. 257-263.

Sen, P. N., "Grain shape effects on dielectric and electrical properties of rocks", Geophysics, 1984, 49, pp. 586-587.

Stroud, D. et al., "Analytical model for the dielectric response of brine-saturated rocks", Physical Review B, 1986, 34(8), pp. 5145-5153.

* cited by examiner

METHODS AND SYSTEMS OF DETERMINING PARAMETERS CHARACTERIZING POROUS MEDIA FROM DATA GATHERED BY A PLURALITY OF DIFFERENT TOOLS

CROSS-REFERENCE TO RELATED APPLICATIONS

The present document is based on and claims priority to U.S. Provisional Application Ser. No. 62/476,902, filed Mar. 27, 2017, which is incorporated herein by reference in its entirety.

TECHNICAL FIELD

The subject disclosure relates to the investigation of geological formations and other porous media. More particularly, the subject disclosure relates to methods and systems of determining parameters (such as apparent cementation factor) that characterize a geological formation or other porous medium via the use of data gathered by a plurality of different downhole logging tools or laboratory tools. The subject disclosure has particular application to oilfield exploration and exploitation although it is not limited thereto.

BACKGROUND

In analyzing and developing oilfields, it is common to drill wellbores in the formation containing a hydrocarbon reservoir for the purpose of running logging tools down the wellbore(s) in order to generate data useful in analyzing the makeup of the formation and the contents of the reservoir. Some of the common logging tools include resistivity logging tools, spectroscopy logging tools, dielectric logging tools, nuclear magnetic resonance (NMR) logging tools and acoustic logging tools. The data obtained from the logging tools are regularly used to analyze and model the geological formation and the reservoir. Information regarding the rock matrix and the fluid volume, such as porosity, permeability, hydrocarbon volume, water and oil saturations, conductivities, etc., are desired results.

Interpretation models are used to estimate parameters that characterize a formation, such as water saturation $S_w$, water salinity, and an apparent cementation factor inn. The apparent cementation factor n is known to combine multiple effects including the effect of pore space tortuosity, which is captured by a cementation exponent m, and the distribution of water and hydrocarbons in the pore system, which is captured by a saturation exponent n in the well-known Archie's equation.

The apparent cementation factor $m_n$ is typically derived from measured dielectric data (permittivity and conductivity) obtained by a dielectric logging tool. The apparent cementation factor $m_n$ has several applications. When the value of the cementation exponent m of a formation can be estimated through measurements, the values of the apparent cementation factor $m_n$ and the cementation exponent m of the formation can be used to estimate the saturation exponent n of the formation, which can then be used to infer information about wettability of the formation. In addition, the value of the apparent cementation factor $m_n$ in a shallow (e.g., invaded) zone of the formation can be used to estimate water saturation in the deep (e.g., virgin) zone of the formation using measurement of resistivity tool of the deep zone and Archie's law.

Note that errors in measured dielectric data (permittivity and conductivity) can result in error in the estimation of the apparent cementation factor $m_n$, which in turn, affects the accuracy of parameters estimated from the apparent cementation factor $m_n$ like the cementation exponent m and the saturation exponent n, which are used to derive water saturation and infer wettability.

SUMMARY

Illustrative embodiments of the present disclosure are directed to methods for determining values for a set of parameters for multiple locations in a formation by inversion of formation data obtained from a plurality of different logging tools. The inversion of the formation data is constrained by certain formation data that characterizes each particular location in the formation as obtained from at least one of the plurality of different logging tools.

In one embodiment, the set of parameters for each particular location in the formation includes apparent cementation factor $m_n$ and a formation water saturation $S_w$, which can be derived by inverting dielectric data that characterizes the particular location in the formation as obtained from a dielectric logging tool.

The certain formation data that is used to constrain the inversion can include at least one of resistivity data (e.g., DC resistance) obtained from a resistivity logging tool and porosity data (e.g., total porosity) obtained from a porosity logging tool.

In embodiments, the apparent cementation factor $m_n$, the formation water saturation $S_w$, and the formation porosity $\phi$ for the plurality of locations in the formation can be used to determine an estimation of at least one cementation exponent m and/or saturation exponent n at multiple locations in the formation (e.g., which can be depths or depth intervals denoted by an index i).

In other embodiments, a method is provided for characterizing a porous medium (such as reservoir rock), which involves determining values for a set of parameters that characterize the porous medium by inversion of data obtained from a plurality of different tools. The inversion of the data that determines the set of parameters is constrained by certain data that characterizes the porous medium as obtained from at least one of the plurality of different tools.

In one embodiment, the set of parameters includes an apparent cementation factor $m_n$ and a formation water saturation $S_w$ that are derived by inverting dielectric data that characterizes the porous medium as obtained from a dielectric tool. The dielectric data can characterize relative permittivity and conductivity of the porous medium. The certain data that is used to constrain the inversion can include at least one of resistivity data obtained from a resistivity tool and porosity data obtained from a porosity tool.

In some embodiments, the plurality of different tools can be realized by a plurality of downhole logging tools.

In other embodiments, the plurality of different tools can be realized by a plurality of laboratory tools.

In various embodiments, the cementation exponent m and saturation exponent n values may be used for, among many applications, inferring wettability, estimating water saturation in virgin zones, and choosing relative permeability curves for dynamic reservoir modeling.

Additional aspects, embodiments, objects, and advantages of the disclosed methods may be understood with reference to the following detailed description taken in conjunction with the provided drawings.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Figure 1:
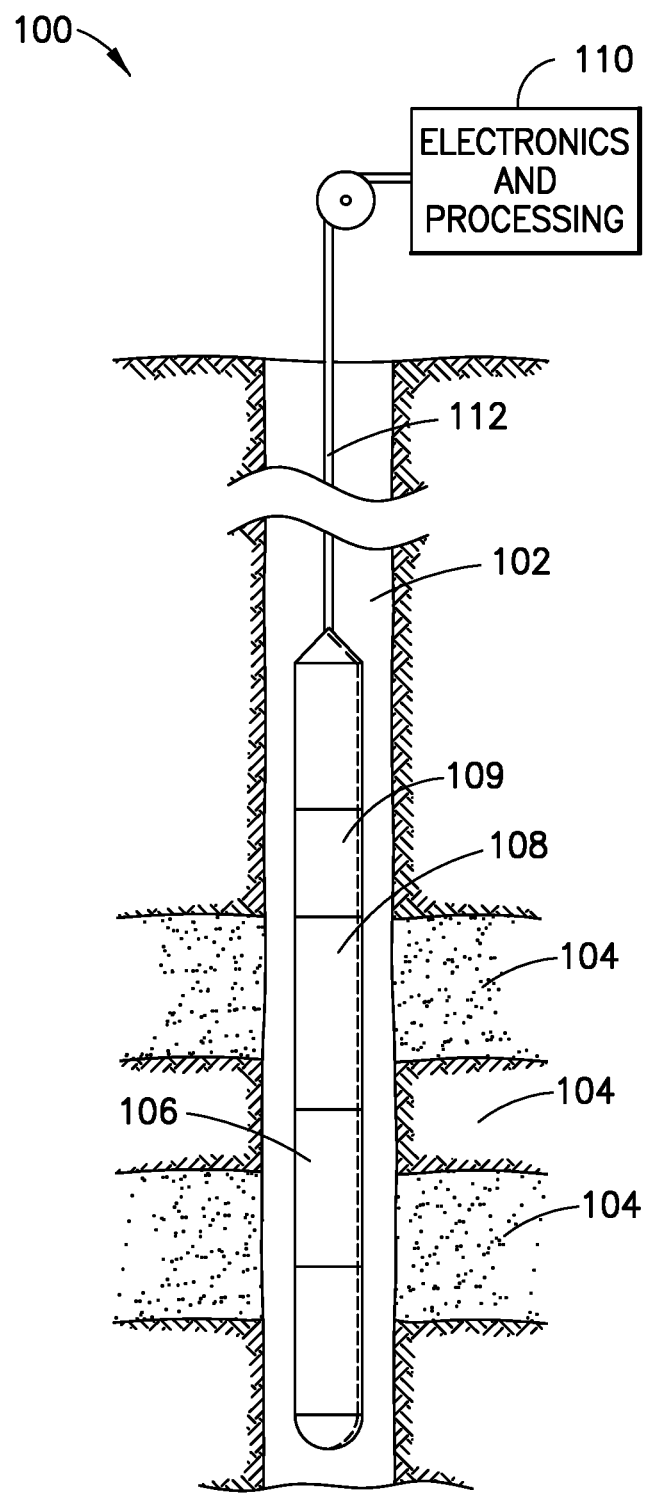
FIG. 1 shows a wellbore logging tool that can be used to acquire formation data that characterizes a formation.

Additionally, some examples discussed herein involve technologies associated with the oilfield services industry. It will be understood however that the techniques of multi-tool measurement processing may also be useful in a wide range of other industries outside of the oilfield services sector, including for example, mining, geological surveying, etc.
Example Wellsite FIG. 1 illustrates a wellsite 100 for which embodiments of multi-tool measurement processing can be employed. Wellsite 100 can be onshore or offshore. In this example system, a bottom hole assembly is positioned within a wellbore 102 that traverses a formation 104. The wellbore 102 can have a vertical inclination as shown. In other embodiments, the wellbore 102 can have a portion with a vertical (or near-vertical) inclination that leads to a curved transition that leads to a portion with a horizontal (or near-horizontal) inclination. Other more complex configurations of the wellbore can be used to traverse the formation 104 as well. The bottom hole assembly can include a string of a number of downhole logging tools 106, 108, 109 that can be conveyed in the wellbore 102 by the wireline cable 112 (or other suitable conveyance means, such as drill pipe, coiled tubing, or tractor). Downhole logging tool 106 is a dielectric logging tool that can be located at one or more depths of the formation 104 and operated to perform dielectric measurements at the one or more depths of the formation 104 to obtain dielectric data at different operational frequencies for the one or more depths of the formation 104. Downhole logging tool 108 is a resistivity logging tool that can be located at one or more depths of the formation 104 and operated to perform resistivity measurements at the one or more depths of the formation 104 to obtain resistivity data for the one or more depths of the formation 104. Downhole logging tool 109 is a porosity logging tool (such as an NMR logging tool or neutron porosity logging tool or other logging tool) that can be located at one or more depths of the formation 104 and operated to perform measurements that obtain porosity data for the one or more depths of the formation 104. The logging tools (e.g., tools 106, 108, 109, etc.) of the bottom hole assembly can be coupled to a processing system 110 via a telemetry subsystem, which can be part of the wireline cable 112 or which can implement other data telemetry methods. The processing system 110 is located at a surface location. Signals and data that are acquired by the logging tools of the bottom hole assembly are communicated uphole by the telemetry subsystem for processing and analysis by the processing system 110. The processing system 110 can be proximate and/or remote from the wellsite 100 (for example, at a computer located at or near the wellsite, a computer located at a remote command center, combinations thereof, etc.) In an alternate embodiment, the processing system 110 or part thereof can be integrated as part of the bottom hole assembly. In one possible embodiment, the processing system 110 or parts thereof can be used to perform various aspects of the multi-tool measurement processing as described herein.

The dielectric logging tool 106 includes transmitters that emit microwaves which propagate into the formation 104 and reach several receivers of the dielectric logging tool 106. The amplitude and phase of the propagated waves with respect to the emitted waves depend on the complex permittivity of the formation 104, the wave frequency and the transmitter-receiver spacing. As the wave's frequency and the tool's geometry are known, dielectric data that characterizes the relative permittivity and conductivity of the formation 104 can be computed by inversion of the amplitude and phase of the propagated waves with respect to the emitted waves as measured by the dielectric logging tool 106. In one embodiment, the dielectric logging tool 106 can be realized by Schlumberger's Dielectric Scanner, which can be configured to perform continuous measurement of formation complex permittivity at four different frequencies, from about 20 MHz up to about 1 GHz. The Dielectric Scanner tool is pad-mounted with two transmitter antenna's and eight symmetrically located receiver antenna's. The two transmitters and eight receivers possess two orthogonal polarization modes, allowing for anisotropy assessment. At a given operating frequency, the symmetry of the Dielectric Scanner tool enables nine attenuation and phase-shift measurements and hence nine relative permittivity and conductivity measurements, each with a different radial response. The Dielectric Scanner tool finally measures thirty-six relative permitivities and thirty-six conductivities, nine couples at every frequency. These measurements can be used to obtain dielectric data that characterizes the dielectric radial profile of the formation 104 near the wellbore 102. The depth of investigation of the measurements is about 1 to four inches with a vertical resolution of 1 inch. Note that other dielectric logging tools can be used as well.

The resistivity logging tool 108 can be configured to derive resistivity data that characterizes resistivity of the formation 104 at a depth of investigation that corresponds to the depth of investigation of the dielectric logging tool 106. The resistivity data can include data that characterizes DC resistance of the formation at the particular depth. The DC resistance can represent electrical resistance of the formation at a low frequency or DC limit. In one embodiment, the resistivity logging tool 108 can be Schlumberger's Micro-Cylindrically Focused Log (MCFL) logging tool, which includes a pad that is mechanically pressed against the mudcake. The pad supports two current electrodes ($A_0$ and $A_1$), a potential electrode $M_0$, and two monitoring electrodes ($M_1$ and $M_2$) that are configured to measure the DC resistance of the formation at a depth of investigation of up to three inches with a vertical resolution of 0.7 inches. Note that other resistivity logging tools can be used.

The porosity logging tool 109, which can be a nuclear magnetic resonance (NMR) logging tool or a nuclear porosity tool or other porosity logging tool, can be used to derive porosity data that characterizes porosity of the formation 104 at a depth of investigation that corresponds to the depth of investigation of the dielectric logging tool 106 and the resistivity logging tool 108.

It will also be understood that the multi-tool processing as described herein can be embodied with while-drilling logging tools that are conveyed inside the wellbore for determining properties of the formation while drilling as is well known in the art. The multiple tools can be integrated together into a unitary housing that is conveyed as part of a bottom-hole assembly in the wellbore.

Example Computing Device

Figure 2:
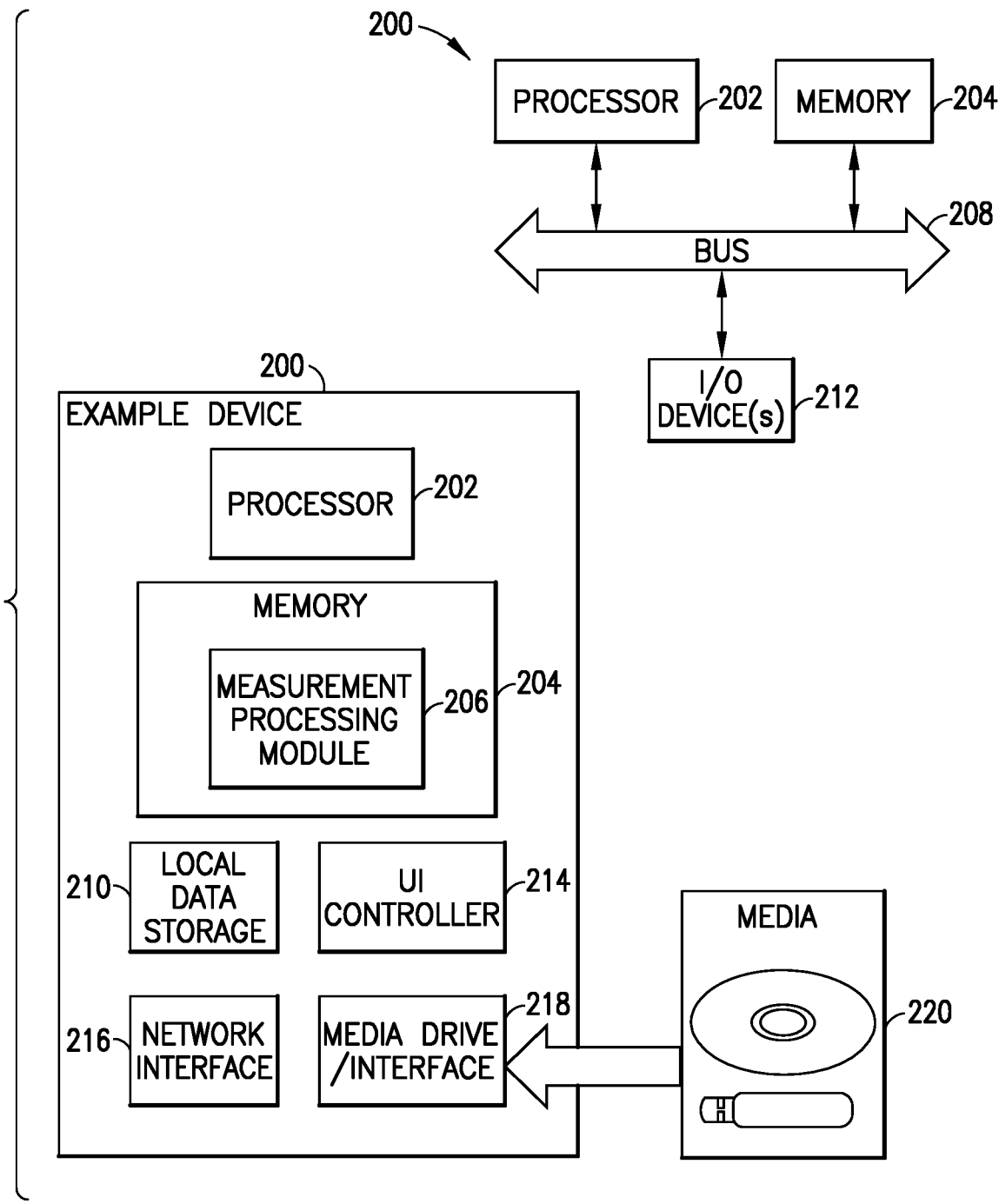
FIG. 2 illustrates an example computing device that can be used in accordance with various embodiments of the present disclosure.

FIG. 2 illustrates an example device 200 (including a processor 202 and computer memory 204) that can be configured to implement various operations of the multi-tool measurement processing discussed in this disclosure. Computer memory 204 can include one or more forms of volatile data storage media such as random access memory (RAM), and/or one or more forms of nonvolatile storage media (such as read-only memory (ROM), flash memory, and so forth).

Device 200 is one example of a computing device or programmable device, and is not intended to suggest any limitation as to scope of use or functionality of device 200 and/or its possible architectures. For example, device 200 can comprise one or more computing devices, programmable logic controllers (PLCs), etc.

Further, device 200 should not be interpreted as having any dependency relating to one or a combination of components illustrated in device 200. For example, device 200 may include one or more of a computer, such as a laptop computer, a desktop computer, a mainframe computer, etc., or any combination or accumulation thereof.

Device 200 can also include a bus 208 configured to allow various components and devices, such as processors 202, memory 204, and local data storage 210, among other components, to communicate with each other.

Bus 208 can include one or more of any of several types of bus structures, including a memory bus or memory controller, a peripheral bus, an accelerated graphics port, and a processor or local bus using any of a variety of bus architectures. Bus 208 can also include wired and/or wireless buses.

Local data storage 210 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 212 may also communicate via a user interface (UI) controller 214, which may connect with IO device(s) 212 either directly or through bus 208.

In one possible embodiment, a network interface 216 may communicate outside of device 200 via a connected network, and in some implementations may communicate with hardware (such as logging tools 106, 108, 109, etc.).

In another possible embodiment, equipment (such as the logging tools 106, 108, 109, etc.) may communicate with device 200 as input/output device(s) 212 via bus 208, such as via a USB port, for example.

A media drive/interface 218 can accept removable tangible media 220, such as flash drives, optical disks, removable hard drives, software products, etc. In one possible embodiment, logic, computing instructions, and/or software programs comprising elements of a measurement processing module 206 may reside on removable media 220 readable by media drive/interface 218.

In one possible embodiment, input/output device(s) 212 can allow a user to enter commands and information to device 200, and also allow information to be presented to the user and/or other components or devices. Examples of input device(s) 212 include communication interfaces, sensors, a keyboard, a cursor control device (e.g., a mouse), a microphone, and any other input devices known in the art. Examples of output devices include a display device (e.g., a monitor or projector), speakers, a printer, communication interfaces, and so on.

Various processes of the measurement processing module 206 may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In one possible embodiment, device 200, or a plurality thereof, can be employed proximate to or remote from the wellsite 100. The device(s) 200 can be part of the processing system 110 or part of the bottom hole assembly of the logging apparatus or a distributed processing system that includes both the processing system 110 and part of the bottom hole assembly of the logging apparatus.

Example Multi-Tool Processing Methods and Technique(s)

Before turning directly to the embodiments of the multi-tool processing methods and techniques, a technical discussion regarding the parameters of interest is useful for understanding the embodiments.

One parameter that is obtained by analyzing data (e.g., using interpretation software) from a downhole logging tool such as a dielectric logging tool or NMR logging tool is $m_n$. The parameter $m_n$ is often called an "apparent cementation factor." More particularly, $m_n$ is a textural parameter that is obtained from inversion of the complex permittivity dispersion measured downhole (and in labs). The forward model used in this inversion is often the Bimodal model or the Stroud-Milton-De (SMD) model. Details of the Bimodal model can be found in K. Mendelson and M. Cohen, "The effects of grain anisotropy on the electrical properties of sedimentary rocks," Geophysics, Vol 47, 1982, pgs 257-263. Details of the Stroud-Milton-De (SMD) model can be found in D. Stroud, G. W. Milton, and B. R. De., "Analytical model for the dielectric response of brine-saturated rocks," Physical Review B, Vol. 34(8), 1986, pgs. 5145-5153.

The predicted conductivity from these models tends to the Archie-like formulation at a low frequency (DC limit) according to:

$$\sigma = (\phi S_w)^{m_n} \sigma_w, \quad (1)$$

where $\sigma$ is the measured conductivity of the partially saturated rock at the low frequency (DC limit), $\sigma_w$ is the conductivity of water at the low (close to zero) frequency (referred to as DC limit), $\phi$ is the rock porosity, $S_w$ is the water saturation of the rock, and $m_n$ is the apparent cementation factor.

The apparent cementation factor $m_n$ combines two effects: (i) the effect of pore space tortuosity which is captured by the cementation exponent m, and (ii) the distribution of water and hydrocarbons in the pore system which is captured by the saturation exponent n.

Archie's law is given from the expression:

$$\sigma = \phi^m S_w^n \sigma_w, \quad (2)$$

where m is the cementation exponent and n is the saturation exponent.

Equation (2) can be combined with Equation (1) to obtain:

$$(\phi S_w)^{m_n} = \phi^m S_w^n. \quad (3)$$

It should be appreciated that unless m=n, there is no constant $m_n$ that will satisfy equation (3) for all water saturations $S_w$. Therefore, the apparent cementation factor $m_n$ may be considered a function of water saturation $S_w$.

Equation (3) may be re-written as:

$$m_n = \frac{m\log(\phi) + n\log(S_w)}{\log(\phi) + \log(S_w)}. \quad (4)$$

From equation (4), it is clear that in a water zone, $m_n = m$ when $S_w = 1$, and that in a hydrocarbon zone, $m_n$ approaches n when $S_w$ is close to zero. This confirms that the parameter $m_n$ is a function of water saturation $S_w$ and varies between n when $S_w$ approaches 0 and m when $S_w = 1$. In a zone with partial oil and water saturations, the apparent cementation factor $m_n$ takes an intermediate value between m and n. Thus, the apparent cementation factor $m_n$ is a combination of m and n involving the total porosity and the invaded zone water saturation.

There are two primary applications of the apparent cementation factor $m_n$: i) computation of virgin zone water saturation, and ii) estimating wettability. Sometimes, a value for the apparent cementation factor $m_n$ is simply assumed (e.g., $m_n = 1.8$ or $m_n = 2.0$). In other cases, values for the apparent cementation factor $m_n$ are estimated from dielectric measurements which are generally sensitive to fluid and rock properties in the invaded zone of a formation around a wellbore.

In order to compute virgin zone water saturation, the apparent cementation factor $m_n$ can be used in conjunction with knowledge of the porosity and the ratio of the formation conductivity to water conductivity according to an expression similar to Archie's law given by:

$$S_w = \frac{1}{\phi}\left(\frac{\sigma}{\sigma_w}\right)^{1/m_n}. \quad (5)$$

Again, it should be appreciated that the value of the apparent cementation factor $m_n$ used in equation (5) can be obtained from dielectric dispersion measurements in the invaded zone by a dielectric logging tool. However, using the apparent cementation factor $m_n$ value of the invaded zone for deriving the saturation in the virgin zone rests on the generally incorrect assumption that $m_n$ is either saturation independent with m=n, or that the virgin zone water saturation is the same as the invaded zone water saturation.

In order to estimate wettability, the value of the apparent cementation factor $m_n$ can be used in conjunction with knowledge of the porosity and water saturation according to equation (4) rewritten as:

$$n = \frac{(m_n - m)\log(\phi) + m_n\log(S_w)}{\log(S_w)}, \quad (6)$$

where the porosity and water saturation are known, and the cementation exponent m is assumed or estimated from sources, such as from an NMR analysis, from a formation micro resistivity imager tool, or from laboratory core study.

The saturation exponent n can be estimated in this manner in Abdelaal, A. F., et al., Integration of Dielectric Dispersion and 3D NMR characterizes the Texture and Wettability of a Cretaceous Carbonate Reservoir, SPE 164150 (2013), and can be used to infer wettability of the formation. However, estimating the saturation exponent n in this manner requires an independent measurement for the estimation of cementation exponent m.

Also note that values for both the cementation exponent m and the saturation exponent n of the formation may be determined through knowledge of the porosity and water saturation of the formation and from dielectric dispersion measurements. Stated in another way, values for both the cementation exponent m and the saturation exponent n of the formation may be determined together without pre-knowledge of the other. In particular, i can be used to denote an index in a set of measurements where the cementation exponent m and the saturation exponent n are expected or assumed to be the same. In downhole data, and as will be discussed hereinafter with respect to particular measurements that may be made for this purpose, this set of measurements may correspond to a depth interval or depth intervals or points with similar petrophysical properties. In surface core measurements, these sets of measurements may correspond to measurements of different saturation stages of a core, measurements on different cores of similar lithology but varying porosity in the same saturation stage, or measurements on different cores with similar Archie parameters but different water saturations and porosities.

Thus, according to one embodiment, equation (4) can be rewritten as $$m_n(i)=(m-n)a(i)+n, \quad (7)$$

where $m_n(i)$ is the estimated $m_n$ at depth i and may be obtained from a dielectric measurement, and $$a(i) = \frac{\log(\phi(i))}{\log(\phi(i)) + \log(S_w(i))}, \quad (8)$$

which may be computed from porosity and water saturation measurements. From equation (8), it will be appreciated that when $S_w(i)=1$, $a(i)=1$ and $m_n=m$. Also, when $S_w(i)=0$, $a(i)=0$ and $m_n=n$. Therefore, in an $m_n$—a crossplot, the data points corresponding to different depths should lie on a straight line with slope (m−n) and intersecting the a=1 and a=0 axes at m and n, respectively.

In one embodiment, values for both the cementation exponent m and the saturation exponent n of the formation over a depth interval i (or over wellbore locations having similar petrophysical properties and given index i) can be estimated according to:

$$\begin{bmatrix} \sum a^2(i) & \sum a(i)(1-a(i)) \\ \sum a(i)(1-a(i)) & \sum (1-a(i))^2 \end{bmatrix} \begin{bmatrix} m \\ n \end{bmatrix} = \begin{bmatrix} \sum a(i)m_n(i) \\ \sum (1-a(i))m_n(i) \end{bmatrix}. \quad (9)$$

For increased robustness, equation (9) can be extended to include weights w(i) at each depth interval according to:

$$\begin{bmatrix} \sum w(i)a^2(i) & \sum w(i)a(i)(1-a(i)) \\ \sum w(i)a(i)(1-a(i)) & \sum w(i)(1-a(i))^2 \end{bmatrix} \quad (10)$$

$$\begin{bmatrix} m \\ n \end{bmatrix} = \begin{bmatrix} \sum w(i)a(i)m_n(i) \\ \sum w(i)(1-a(i))m_n(i) \end{bmatrix}.$$

For example, the weights can be set as the inverse of the uncertainty associated with the $m_n$ value, which may have been computed during the inversion of the dielectric measurements.

Note that the details of finding the cementation exponent m and the saturation exponent n of the formation according to Eqns. (7)-(10) above are similar to those described in U.S. patent application Ser. No. 14/962,201, entitled "Methods of Determining Cementation Exponent and Saturation Exponent in Porous Media from Dielectric Dispersion Data," filed on Dec. 8, 2015, commonly assigned to assignee of the present application and herein incorporated by reference in its entirety. Note that although the present disclosure discusses integration with an Archie equation, the methodology and systems described in the present disclosure can be adapted to include other Archie-like equations that relate bulk conductivity to rock conductivity through porosity, water saturation, and other petrophysical and fluid parameters.

Figure 3:
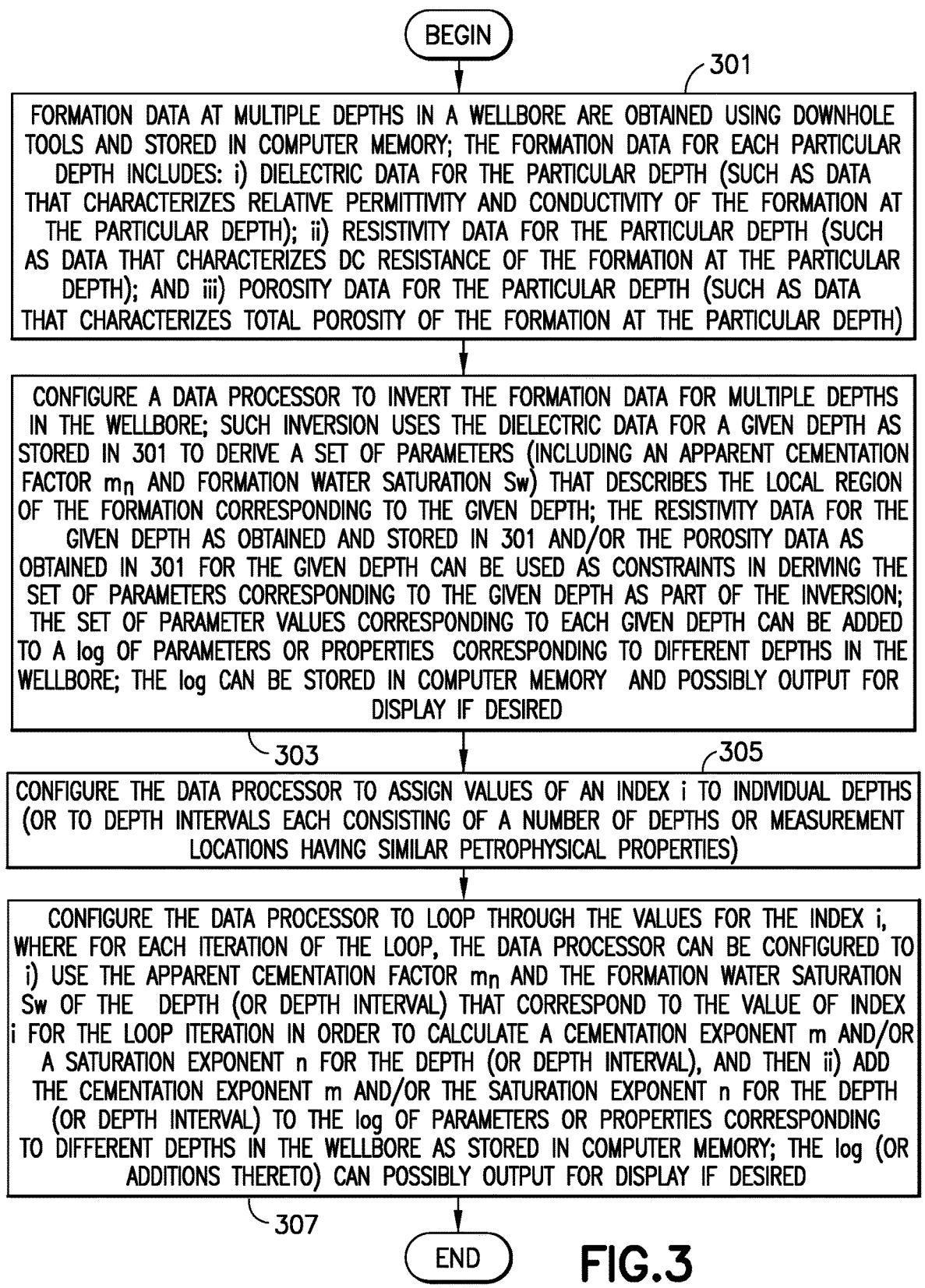
FIG. 3 is a flow chart that shows a method in accordance with one embodiment of the present disclosure.

Turning to FIGS. 3A and 3B, a method according to one embodiment of the present disclosure is shown. More particularly, at 301, formation data at multiple depths in a wellbore are obtained using downhole logging tools and stored in computer memory, which can be volatile or non-volatile memory of the processing system 110 of FIG. 1. The formation data for each particular depth in a wellbore can include: i) dielectric data for the particular depth (such as data that characterizes relative permittivity and conductivity of the formation at the particular depth); ii) resistivity data for the particular depth (such as data that characterizes DC resistance of the formation at the particular depth); and/or iii) porosity data for the particular depth (such as data that characterizes total porosity of the formation at the particular depth).

The dielectric data for the particular depth can be obtained by locating the dielectric logging tool 106 at the particular depth in the wellbore 102 and operating the dielectric logging tool 106 at a number of different frequencies to investigate a local region of the formation 104 in order to obtain the dielectric data for the particular depth. In one embodiment, such dielectric data can include data that characterizes relative permittivity and conductivity of the formation at the particular depth.

The resistivity data for the particular depth can be obtained by locating the resistivity logging tool 108 at the particular depth in the wellbore 102 and operating the resistivity logging tool 108 to investigate the same local region of the formation 104 in order to obtain resistivity data for the particular depth. In one embodiment, such resistivity data can include data that characterizes DC resistance of the formation at the particular depth. The DC resistance can represent electrical resistance of the formation at a low frequency or DC limit.

The porosity data for the particular depth can be obtained by locating the porosity logging tool 109 at the particular depth in the wellbore 102 and operating the porosity logging tool 109 to investigate the same local region of the formation 104 in order to obtain porosity data for the particular depth. In one embodiment, such porosity data can include data that characterizes total porosity of the formation at the particular depth.

At 303, a data processor, which can be part of the processing system 110 of FIG. 1, can be configured to invert the formation data for multiple depths in the wellbore. Such inversion uses the dielectric data for a given depth as stored in 301 to derive a set of parameters (including the apparent cementation factor $m_n$ and the formation water saturation $S_w$) that describes the local region of the formation corresponding to the given depth. The resistivity data for the given depth as obtained and stored in 301 as well as the porosity data as obtained in 301 for the given depth can be used as constraints in deriving the set of parameters corresponding to the given depth as part of the inversion. The result of the inversion are values for a set of parameters (e.g., $m_n$, $S_w$) for each one of the multiple depths. The set of parameter values corresponding to each given depth can be added to a log of parameters or properties corresponding to different depths in the wellbore. The log can be stored in computer memory, which can be part of the processing system 110 of FIG. 1. The values for the parameters and properties of the log can include the apparent cementation factor $m_n$ and the formation water saturation $S_w$ as well as other parameters and/or properties. The log can be output for display in order to display the apparent cementation factor $m_n$ and the formation water saturation $S_w$ as well as other parameters and/or properties as desired.

If the resistivity data for the given depth has not been measured, resistivity data for the given depth can be estimated from other resistivity measurements and used as a constraint in the inversion of 303. Similarly, if the porosity data for the given depth has not been measured, porosity data for the given depth can be estimated from other porosity measurements and used as a constraint in the inversion of 303.

In one embodiment, the predicted conductivity of the reservoir rock at a low frequency (DC limit) according to the Archie-like formulation given by Eqn. 1 can be used as a constraint in the inversion of 303. In this case, values for the DC rock conductivity, DC water conductivity and rock porosity provide a mathematical functional relationship between $S_w$ and $m_n$ at the low frequency (DC limit). The DC rock conductivity can be provided by the resistivity tool measurement. Rock porosity can be provided by the porosity measurement. DC water conductivity can be inferred from literature or measured at the wellsite. For example, when water-based mud is used, the DC resistivity of the mud can be inferred from literature or can be measured at the wellsite and used to determine the DC water conductivity. In this example, the mathematic functional relationship between $S_w$ and $m_n$ as derived from Eqn. 1 can be used in selecting (tuning) the values of $S_w$ and/or $m_n$ over iterations of the inversion when solving for the best fit parameters of $S_w$ and $m_n$.

At 305, the data processor, which can be part of the processing system 110 of FIG. 1, can be configured to assign values of an index i to individual depths (or to depth intervals each consisting of a number of depths or measurement locations having similar petrophysical properties).

At 307, the data processor, which can be part of the processing system 110 of FIG. 1, can be configured to loop through the values for the index i as assigned in 305. For each iteration of the loop, the data processor can be configured to i) use the apparent cementation factor $m_n$ and the formation water saturation $S_w$ of the depth (or depth interval) that correspond to the value of index i for the loop iteration in order to calculate a cementation exponent m and/or a saturation exponent n for the depth (or depth interval), and then ii) add the cementation exponent m and/or the saturation exponent n for the depth (or depth interval) to the log of parameters or properties corresponding to different depths in the wellbore as stored in computer memory, which can be part of the processing system 110 of FIG. 1. The log (or additions thereto) can be output for display if desired.

In one embodiment, the porosity and water saturation measurements of the depth (or depth interval) associated with the value of the index i for the specific loop iteration can be used in 307 to calculate the value for a(i) according to Eqn. 8 above. The values for a(i) and the apparent cementation factor $m_n$(i) for the index i of the specific loop iteration can then be used to determine values for the cementation exponent m(i) and the saturation exponent n(i) for the index i of the specific loop iteration. In some embodiments, Eqn. 9 can be used to calculate the cementation exponent m(i) and the saturation exponent n(i) (i.e., the cementation exponent m and the saturation exponent n for the index i of the specific loop iteration). In some embodiments, where uncertainties associated with the apparent cementation factor $m_n$ value is obtained, Eqn. 10 can be used to calculate values for the cementation exponent m(i) and the saturation exponent n(i) for the index i of the specific loop iteration (i.e., values for the cementation exponent m and the saturation exponent n for the index i of the specific loop). Note that the weights w(i) of Eqn. 10 are related to the uncertainties, typically by being the inverses of the uncertainties. In other embodiments, for each depth interval, a(i), a number of $m_n$ values are generated, optionally plotted, and fit to a line in order to provide m and n estimates of m and n for the depth interval.

Figure 4A:
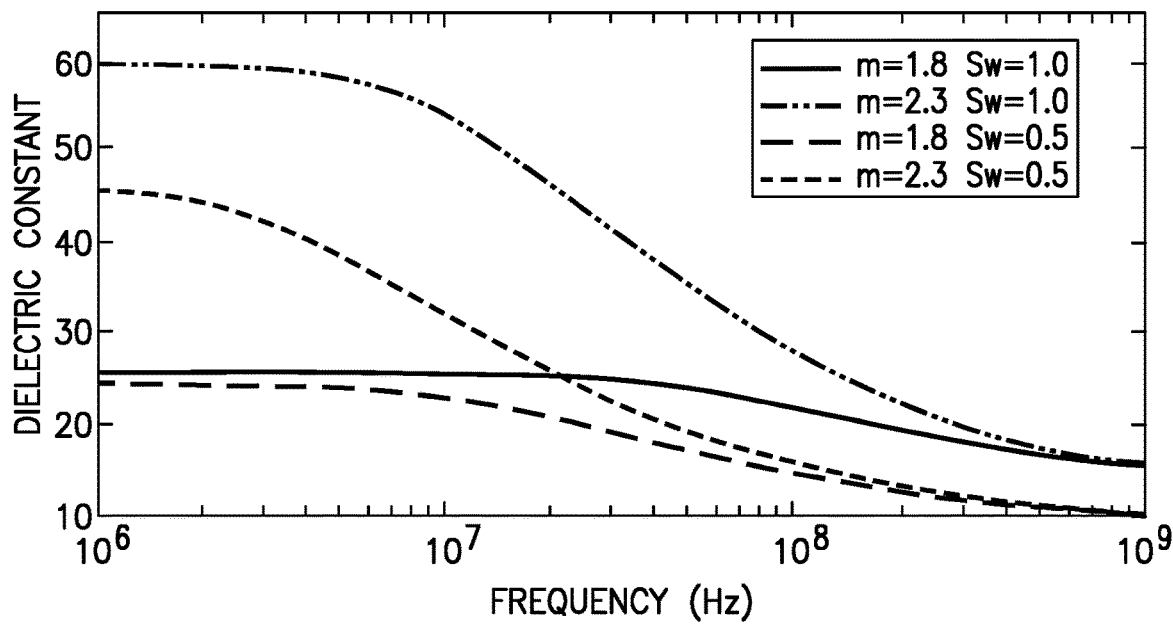
FIGS. 4A and 4B are plots of dielectric constant and conductivity, respectively, as a function of frequency for a number of different combinations of cementation exponent m and water saturation S.
Figure 4B:
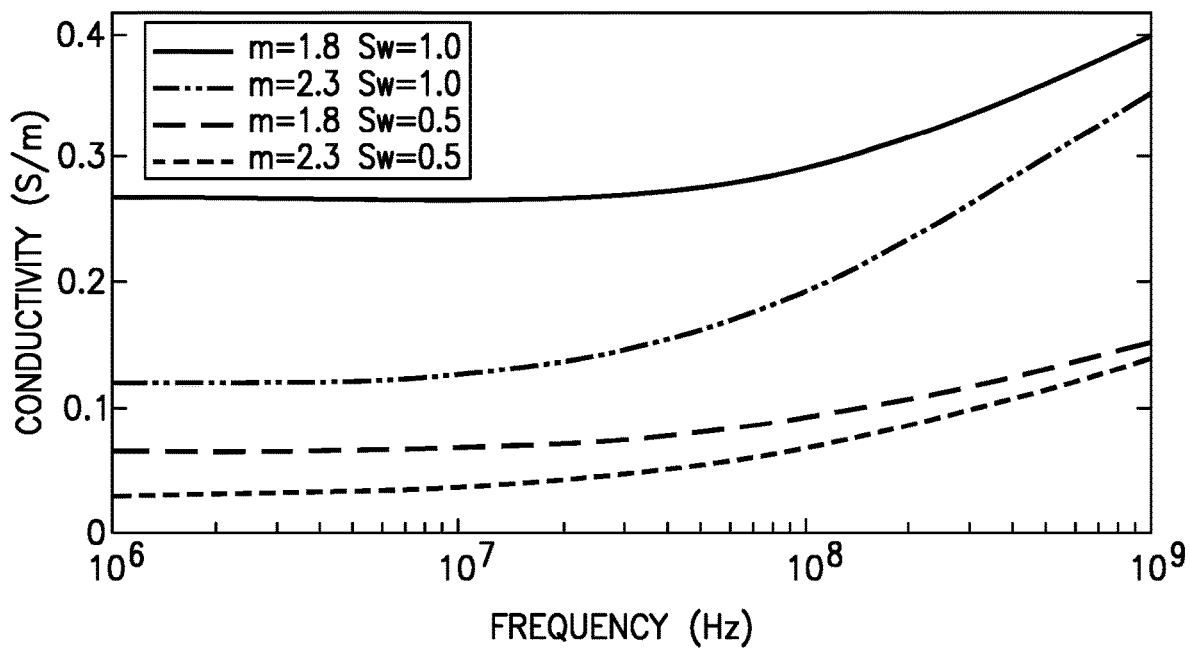

FIGS. 4A and 4B show values for dielectric constant and conductivity simulated from the Bimodal model as described above for different values of cementation exponent m and $S_w$ (and consequently different values of $m_n$). Note that the curves of the dielectric constant of FIG. 4A (which relate to permittivity) have the highest difference at low frequencies less than 1 GHz. Since the only parameter of Bimodal model that varies over the curves of the dielectric constant of FIG. 4A is $m_n$, it can be inferred that information about $m_n$ is mainly at low frequencies less than 1 GHz. These results are expected as the apparent cementation factor $m_n$ is known to affect the interfacial polarization phenomenon, which is present at low frequencies only.

Figure 5A:
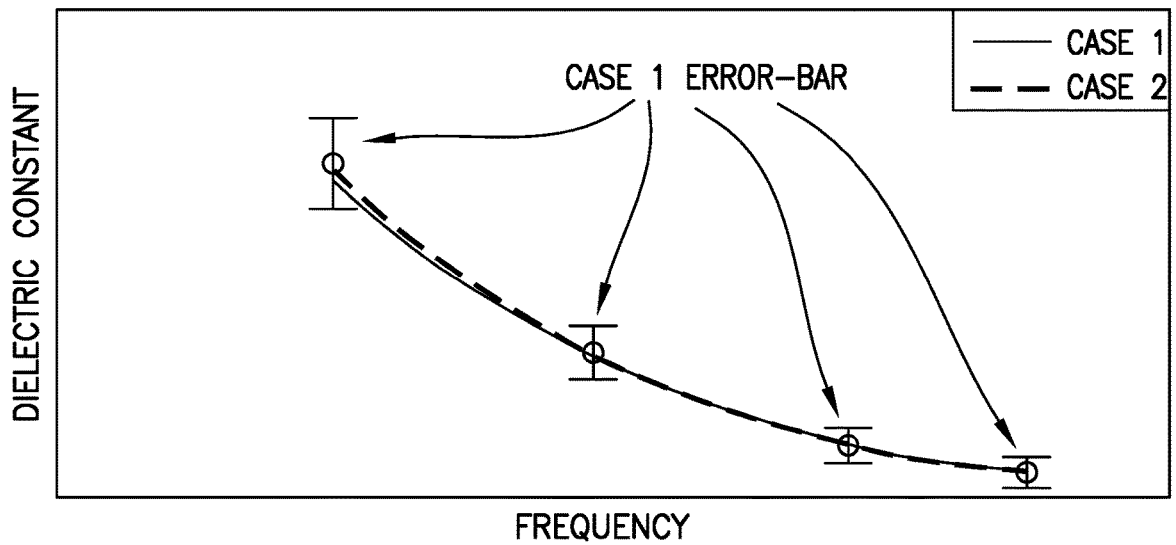
FIGS. 5A and 5B are plots of dielectric constant and conductivity, respectively, as a function of frequency as determined by inversion of two computational models that are depicted schematically in FIGS. 6A and 6B.
Figure 5B:
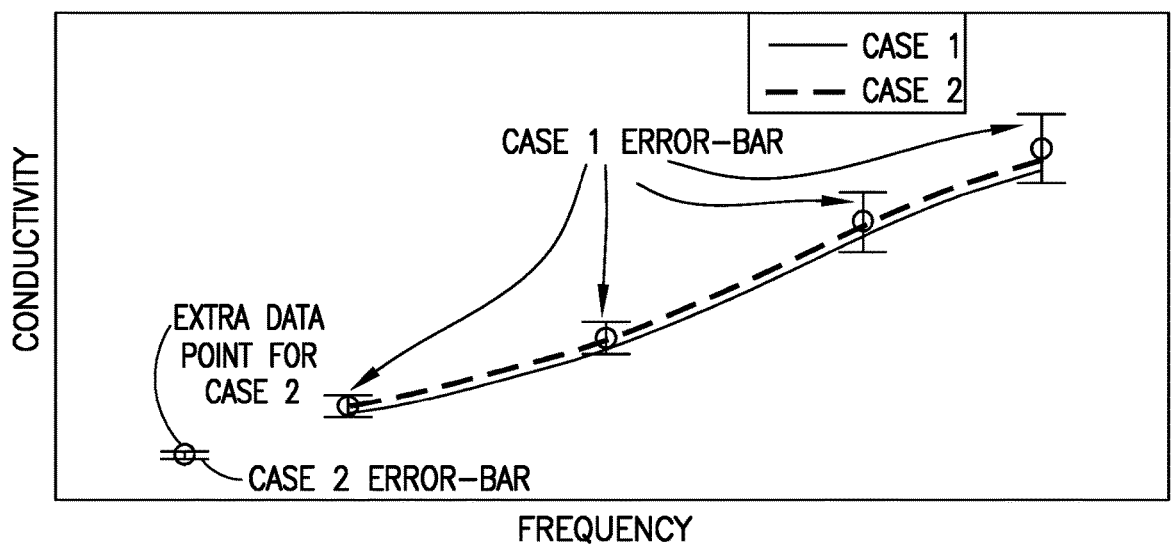
Figure 6A:
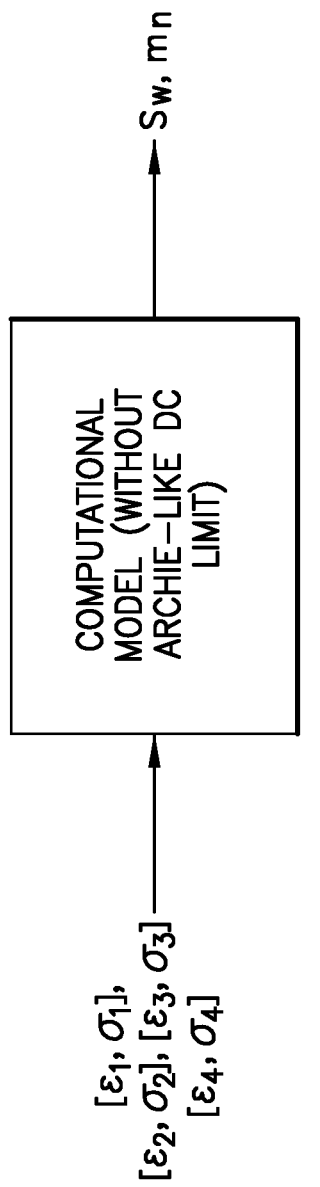
Figure 6B:
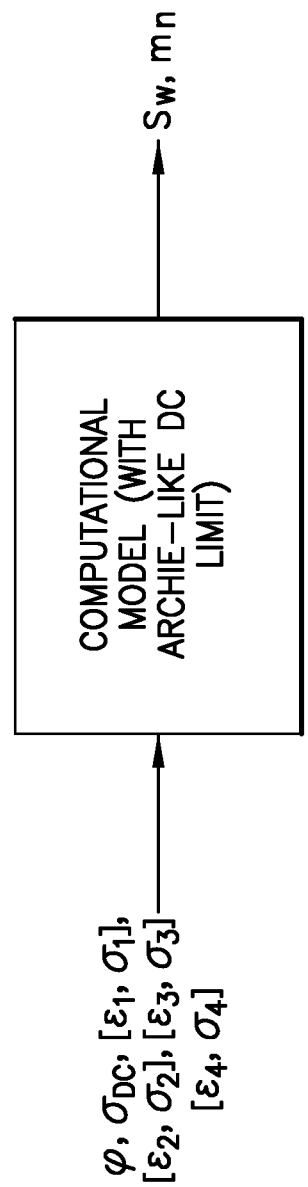

FIGS. 5A and 5B show the predicted dielectric constant and predicted conductivity, respectively, as derived from an inversion using the Bimodal Model as described above for two different cases (labeled "case-1" and "case-2"). For case-1, the inversion is based on the electromagnetic response data (e.g., amplitude and phase of the propagated waves with respect to the emitted waves) at four different frequencies as measured by a dielectric logging tool (in this case, Schlumberger's Dielectric Scanner). The inversion of the computational model (forward model) used for case-1 need not employ an Archie-like DC limit (e.g., a constraint derived from Equation (1) as described above) as represented schematically in the schematic of FIG. 6A. For case-2, the inversion is based on the electromagnetic response data (e.g., amplitude and phase of the propagated waves with respect to the emitted waves) at four different frequencies as measured by a dielectric logging tool (in this case, Schlumberger's Dielectric Scanner) as well as an additional measurement of conductivity at low frequency (DC limit) and an additional measurement of rock porosity. The measurement of conductivity at the low frequency (DC limit) can be the inverse of the low frequency (DC limit) resistivity as measured by a resistivity logging tool (in this case, Schlumberger's MicroCylindrically Focused Log (MCFL) tool). The inversion of the computational model (forward model) used for case-2 employs an Archie-like DC limit (e.g., a constraint derived from Equation (1) as described above) as represented schematically in the schematic of FIG. 6B.

Note that FIG. 5A also shows error bars that represent the error between the predicted dielectric constant and measured dielectric constant at the four different frequencies as measured by a dielectric logging tool for the inversion of case-1. FIG. 5B also shows error bars that represent the error between the predicted conductivity and measured conductivity at the four different frequencies as measured by a dielectric logging tool for the inversion of case-1. FIG. 5B also shows an error bar that represents the error between the predicted conductivity and measured conductivity at the low frequency (DC limit) for the inversion of case-2. The measured conductivity at the low frequency (DC limit) is the inverse of the low frequency (DC limit) resistivity as measured by a resistivity logging tool for case-2.

Note that the curves of FIG. 5A show that the errorbars of the dielectric constant at lower frequencies is much higher than the errorbars of conductivity, due to the nature of the measurement. This is because complex permittivity is close to the imaginary axis for low frequencies, resulting in a more accurate measurement for conductivity and higher error for the dielectric constant. This fact leads to high errorbars in the apparent cementation factor $m_n$, which are typically between 7%-10% in field data.

Also note that because the apparent cementation factor $m_n$ is more sensitive to low frequencies, the additional measurement of conductivity at low frequency (DC limit) used in the case-2 inversion can decrease the errorbar in the apparent cementation factor $m_n$. This is shown in the case-2 error bar of FIG. 5B. Furthermore, the apparent cementation factor $m_n$ need not be derived from Eq. (1). Instead, it can be derived as a direct parameter of the model or as a byproduct. Thus, as part of the computation model, the apparent cementation factor $m_n$ can be defined using Eq. (1), and computed using different expressions dependent on the model parameters. As a consequence, for the same data set, the estimate of the apparent cementation factor $m_n$ is model dependent, making its interpretation challenging. The use of the additional measurement of conductivity at low frequency (DC limit) as a constraint in the inversion can allow the computation model to provide a similar and consistent apparent cementation factor $m_n$ and can decrease the errorbar in the apparent cementation factor $m_n$ as derived from the inversion.

The accuracy of the inversion operations as described herein can be verified using simulated data created from the Bimodal model as follows. Three parameters are inputs to the Bimodal model. These three parameters include the apparent cementation factor $m_n$, the water saturation $S_w$, and the percentage of ellipsoidal inclusions p. The parameter p is described in more detail in Kenneth S. Mendelson and Morrel H. Cohen, "The effect of grain anisotropy on the electrical properties of sedimentary rocks," Geophysics, 47, pg. 257-263, 1982 as well as P. N. Sen, "Grain shape effects on dielectric and electrical properties of rocks," Geophysics, 49, pg. 586-587, 1984. The true values for the three Bimodal parameters are input to the Bimodal model to simulate dielectric data at four frequencies of the dielectric tool. Random noise is added to the simulated dielectric data. The noisy simulated dielectric data is compared to measured dielectric data at the same four frequencies of the dielectric tool, and the results of the comparison is used to revise the values for the three Bimodal parameters. This inversion process can be repeated for multiple iterations until the solution converges by satisfying a predetermined stopping criterion. The solution provides estimates for the three Bimodal parameters ($m_n$, $S_w$, and p) that characterize the reservoir rock. Note that the dielectric data at the four frequencies of the dielectric tool have 10% error, while the error at the low frequency (DC limit) varies from 1% to 100%. A Monte Carlo simulation can be performed by repeating this process multiple times to obtain the normalized root mean square error (NRMSE) of $m_n$ as follows:

$$NRMSE(m_n) = \frac{\sqrt{(m_{n,true} - m_{n,mean})^2 + m_{n,std}^2}}{m_{n,true}} \quad (7)$$

where $m_{n,true}$ is the true value of the apparent cementation factor $m_n$ that was used to simulate the dielectric data, $m_{n,mean}$ is the mean value of the apparent cementation factor $m_n$ from all the iterations of the Monte Carlo simulation and $m_{n,std}$ is the standard deviation of the apparent cementation factor $m_n$ from all the iterations of the Monte Carlo simulation.

Figure 7:
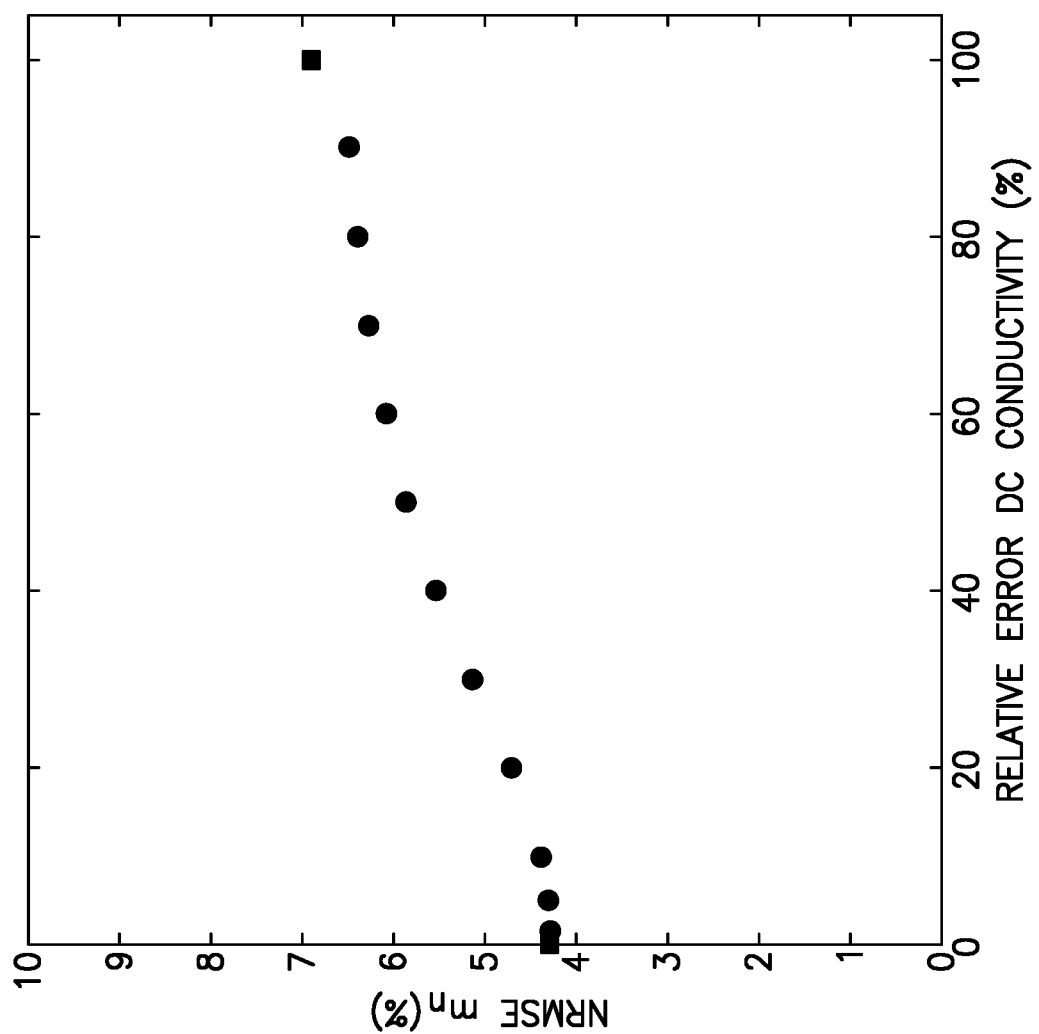
FIG. 7 is a plot of normalized root mean square error of the apparent cementation factor $m_n$ as a function of the relative error of DC conductivity, which is obtained from inversions using the computational models of FIGS. 6A and 6B in conjunction with Monte Carlo simulations.

FIG. 7 shows the NRMSE of the apparent cementation factor $m_n$ as a function of conductivity error at the low frequency (DC limit) for an exemplary Monte Carlo simulation as described above. The error in the dielectric data at the four frequencies of the dielectric tool is assumed to be 10%. The last point of the plot, which is a square, shows the NRMSE of the apparent cementation factor $m_n$ when the low frequency (DC limit) term of conductivity is not included as part of the inversion. In this case, where the inversion utilizes the dielectric data at the four frequencies and ignores the low frequency (DC limit) term of conductivity, the NRMSE of the apparent cementation factor $m_n$ is 7%. The other points of the plot, which are circles, show the NRMSE of the apparent cementation factor $m_n$ when the low frequency (DC limit) term of conductivity is included as part of the inversion. In this case, where the inversion utilizes the dielectric data at the four frequencies in addition to the low frequency (DC limit) term of conductivity, the NRMSE of the apparent cementation factor $m_n$ gets reduced as the error of the conductivity at DC frequency gets smaller. Specifically, the NRMSE of the apparent cementation factor $m_n$ is equal to 4% at the low frequency (DC limit) for the assumed 10% error in conductivity.

Figure 8A:
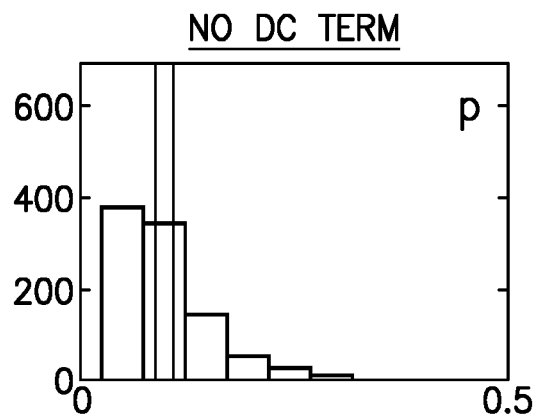
FIGS. 8A and 8B are plots that show the distribution of the parameter p (percentage of ellipsodoidal inclusions) as well as true and mean values for the parameter p that are obtained from inversions used in conjunction with Monte Carlo simulations. The plot of FIG. 8A is derived from an inversion using the computational model of FIG. 6A, while the plot of FIG. 8B is derived from an inversion using the computational model of FIG. 6B.
Figure 8B:
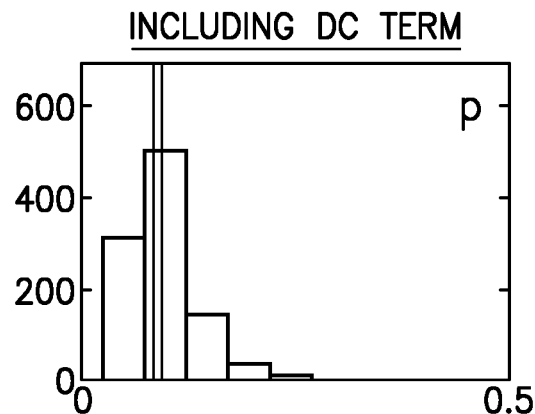
Figure 8C:
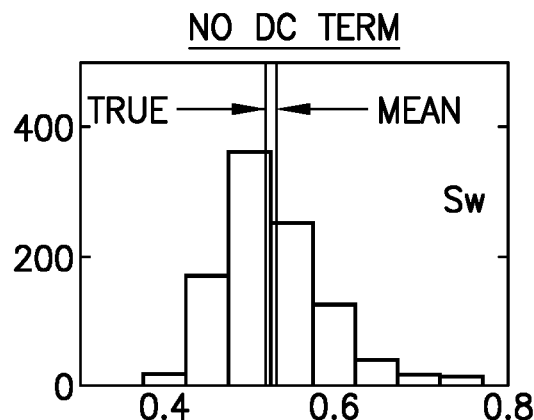
FIGS. 8C and 8D are plots that show the distribution of the water saturation $S_w$ as well as true and mean values of the water saturation $S_w$ that are obtained from inversions used in conjunction with Monte Carlo simulations. The plot of FIG. 8C is derived from an inversion using the computational model of FIG. 6A, while the plot of FIG. 8D is derived from an inversion using the computational model of FIG. 6B.
Figure 8D:
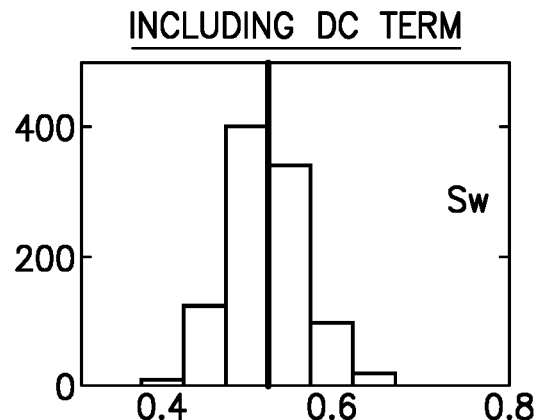
Figure 8E:
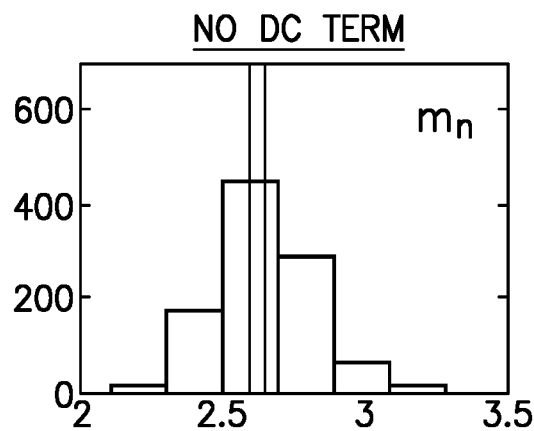
FIGS. 8E and 8F are plots that show the distribution of the apparent cementation factor $m_n$ as well as true and mean values of the apparent cementation factor $m_n$ that are obtained from inversions used in conjunction with Monte Carlo simulations. The plot of FIG. 8E is derived from an inversion using the computational model of FIG. 6A, while the plot of FIG. 8F is derived from an inversion using the computational model of FIG. 6B.
Figure 8F:
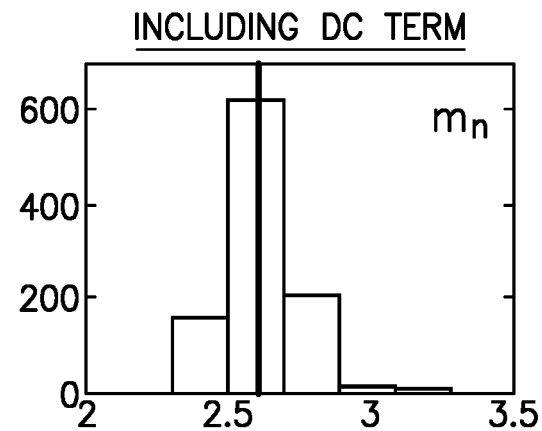

FIGS. 8A to 8F show distributions of three parameters ($m_n$, $S_w$, and p) of the Bimodal model that characterize the reservoir rock as obtained from the iterations of the exemplary Monte Carlo simulation used to derive the plot of FIG. 7. FIGS. 8A and 8B show distributions of the parameter p of the Bimodal model where the low frequency (DC limit) term of conductivity is not included as part of the inversion (FIG. 8A) and where the low frequency (DC limit) term of conductivity is included as part of the inversion (FIG. 8B). FIGS. 8C and 8D show distributions of the parameter $S_w$ of the Bimodal model where the low frequency (DC limit) term of conductivity is not included as part of the inversion (FIG. 8C) and where the low frequency (DC limit) term of conductivity is included as part of the inversion (FIG. 8D). FIGS. 8E and 8F show distributions of the parameter $m_n$ of the Bimodal model where the low frequency (DC limit) term of conductivity is not included as part of the inversion (FIG. 8E) and where the low frequency (DC limit) term of conductivity is included as part of the inversion (FIG. 8F). FIGS. 8A to 8F also include lines that represent the true and mean values for the distributions of three parameters ($m_n$, $S_w$, and p) of the Bimodal model that characterize the reservoir rock.

Note that although the inversion operations of FIGS. 7 and 8A to 8F use the Bimodal Model as part of the inversion, other computational models capable of predicting the dielectric and resistivity response at multiple frequencies can be used to carry out the inversion. Similarly, the low frequency (DC limit) term of conductivity as measured by the resistivity logging tool can be used to define other useful constraints for the inversion in order to improve the accuracy of the rock parameters that are produced by the inversion.

Also note that the values of $m_n$, $\phi$ and $S_w$ can be used to categorize the reservoir rock according to their pore geometry from the cementation exponent m and to infer wettability from the saturation exponent n. More specifically, the cementation exponent m and/or the saturation exponent n of the reservoir rock can be calculated using the values of $m_n$, $S_w$ and $\phi$ of the reservoir rock (Block 315 of FIG. 3B and Equations (8) and (9) above). In one embodiment, the cementation exponent m and the saturation exponent n can be assumed to be constant over a set of measurements corresponding to a depth range of similar lithology downhole. In this case, the reduction in the errorbar of the apparent cementation factor $m_n$ can reduce the errorbars in the calculated values of the cementation exponent m and the saturation exponent n, respectively.

Furthermore, the additional measurement of the low frequency (DC limit) term of conductivity of the formation can also be used to increase the vertical resolution of the calculation of the cementation exponent m and the saturation exponent n, respectively. This is summarized in Table 1 below.

TABLE 1

| Error in data | Number of data points | Error in $m_n$ | Error in m | Error in n |
|---|---|---|---|---|
| Case 1 - 10% without $\sigma_{DC}$ | 100 | 7% | 3% | 13% |
| Case 2 - 10% + 10% in $\sigma_{DC}$ | 100 | 4% | 2% | 10% |
| Case 3 - 10% + 10% in $\sigma_{DC}$ | 40 | 4% | 3% | 13% |

Data was simulated with a 10% error using the Bimodal model. In a first case ("case 1"), the simulation was run without inclusion of the low frequency (DC limit) measurement of conductivity of the formation using a depth range discretized by 100 points. In this first case, the error in the apparent cementation factor $m_n$ is approximately 7% with an errorbar of 3% for the cementation exponent m and 13% for the saturation exponent n of the formation. In a second case ("case 2"), the simulation was run with inclusion of the low frequency (DC limit) measurement of conductivity of the formation using a depth range discretized by 100 points. In this second case, the error in the apparent cementation factor $m_n$ is approximately 4% with an errorbar of 2% for the cementation exponent m and 10% for the saturation exponent n of the formation. These results show that reducing the errorbar for the apparent cementation factor $m_n$ can reduce the errorbar in the cementation exponent m and the saturation exponent n over the same depth interval or increase the vertical resolution of these measurements.

In still other embodiments, the data processing operations that characterize the reservoir rock as described herein can be based on dielectric data, resistivity data and/or porosity data acquired using laboratory measurements. In such an embodiment, a number of core samples of reservoir rock can be extracted using a coring tool and/or wellbore cuttings collected during wellbore drilling operation. The cores and/or cuttings can be analyzed in a laboratory with a different laboratory tool to derive dielectric data, resisitivity data and/or porosity data of the reservoir rock. Such data can be inverted using the methodology as described herein to determine parameters and properties that characterize the reservoir rock.

Although only a few examples have been described in detail above, those skilled in the art will readily appreciate that many modifications are possible in the examples without materially departing from this disclosure. Thus, by way of example only, and not by way of limitation, while various embodiments describe specific tools and techniques, it will be appreciated that other tools and techniques may be utilized. Further, while specific uses of the estimations of the parameters were described, it will be appreciated that any one or subsets of these parameters may be utilized for other purposes as well. Accordingly, all such modifications are intended to be included within the scope of this disclosure.

What is claimed is:

1. A method for determining values of at least one parameter of a geological formation, the method comprising:

determining values for a set of parameters for a plurality of locations in the geological formation by inversion of formation data obtained from a plurality of different logging tools, wherein the inversion of the formation data that determines a set of parameters for each particular location in the geological formation is constrained by certain formation data that characterizes the particular location in the geological formation as obtained from at least one of the plurality of different logging tools, wherein the set of parameters for each particular location in the geological formation includes an apparent cementation factor $m_n$ and a formation water saturation $S_w$ that are derived by inverting dielectric data that characterizes the particular location in the geological formation as obtained from a dielectric logging tool;

using the apparent cementation factor $m_n$, the formation water saturation $S_w$, nd a formation porosity $\phi$ for the plurality of locations to determine an estimation of at least one of a cementation exponent m and a saturation exponent n of the geological formation; and using the apparent cementation factor $m_n$ based at least in part on measurements in an invaded zone to estimate virgin zone water saturation and drilling into the virgin zone based at least in part on the estimated water saturation of the virgin zone estimated using the apparent cementation factor $m_n$.

2. The method of claim 1, wherein:

the inversion of the formation data obtained from the plurality of different logging tools determines a set of parameters with reduced errorbar for such parameters.

3. The method of claim 1, wherein:

the dielectric data characterizes relative permittivity and conductivity at the particular location in the geological formation.

4. The method of claim 1, wherein:

the certain formation data that is used to constrain the inversion includes at least one of resistivity data obtained from a resistivity logging tool and porosity data obtained from a porosity logging tool.

5. The method of claim 4, wherein:

the certain formation data that is used to constrain the inversion includes resistivity data obtained from the resistivity logging tool, wherein the resistivity data characterizes DC resistance of the particular location in the geological formation.

6. The method of claim 4, wherein:

the certain formation data that is used to constrain the inversion includes porosity data obtained from the porosity logging tool, wherein the porosity data characterizes total porosity of the particular location in the geological formation.

7. The method of claim 1, wherein:
at least one of the cementation exponent m and the saturation exponent n are determined according to $m_n(i)=(m-n)a(i)+n$, where $m_n(i)$ is an estimated $m_n$ at depth i of one of the plurality of locations, and $$a(i) = \frac{\log(\phi(i))}{\log(\phi(i)) + \log(S_w(i))}.$$

8. The method of claim 1, wherein:
at least one of the cementation exponent m and the saturation exponent n are determined by fitting a line to points on a plot having $m_n$ and a(i) as axes, and finding the saturation exponent n as an intersection of the line to where a(i)=0.

9. The method of claim 1, wherein:
at least one of the cementation exponent m and the saturation exponent n are determined by fitting a line to points on a plot having $m_n$ and a(i) as axes, and finding the cementation exponent m as an intersection of the line to where a(i)=1.

10. The method of claim 1, wherein:
at least one of the cementation exponent m and the saturation exponent n are determined by finding m and n according to $$\begin{bmatrix} \sum a^2(i) & \sum a(i)(1-a(i)) \\ \sum a(i)(1-a(i)) & \sum (1-a(i))^2 \end{bmatrix} \begin{bmatrix} m \\ n \end{bmatrix} = \begin{bmatrix} \sum a(i)m_n(i) \\ \sum (1-a(i))m_n(i) \end{bmatrix}.$$

11. The method of claim 1, wherein:
at least one of the cementation exponent m and the saturation exponent n are determined by finding m and n according to $$\begin{bmatrix} \sum w(i)a^2(i) & \sum w(i)a(i)(1-a(i)) \\ \sum w(i)a(i)(1-a(i)) & \sum w(i)(1-a(i))^2 \end{bmatrix} \begin{bmatrix} m \\ n \end{bmatrix} = \begin{bmatrix} \sum w(i)a(i)m_n(i) \\ \sum w(i)(1-a(i))m_n(i) \end{bmatrix},$$

where w(i) are weights.

12. The method of claim 11, wherein:
the weights are a function of uncertainties associated with values of the apparent cementation factor $m_n$.

13. The method of claim 1, wherein using the cementation factor $m_n$ to estimate the virgin zone water saturation comprises using the cementation exponent m and the saturation exponent n to estimate virgin zone water saturation according to $\sigma=\phi^m S_w^n \sigma_w$, where $\sigma$ is a measured conductivity of partially saturated rock at the plurality of locations and $\sigma_w$ is the direct current conductivity of water at the plurality of locations.

14. The method of claim 1, wherein:
the inversion is carried out by a computer processing system.

15. The method of claim 14, further comprising:
storing the set of parameters for the plurality of locations as part of a log stored in computer memory of the computer processing system.

16. The method of claim 15, further comprising:
displaying the log stored in the computer memory of the computer processing system in order to display the set of parameters for the plurality of locations that are part of the log.

17. The method of claim 1, wherein:
the plurality of different logging tools are realized by a string of logging tools of a bottom hole assembly that is conveyed in a wellbore that traverses the geological formation.

18. The method of claim 1, wherein:
the plurality of different logging tools are integrated into a unitary housing of a bottom hole assembly that is conveyed in a wellbore that traverses the geological formation.

19. The method of claim 1, wherein determining the value for the apparent cementation factor $m_n$ comprises using a measurement of conductivity at a DC limit.

20. A method for determining values of at least one parameter of a geological formation, the method comprising:
obtaining formation data for a plurality of locations in the geological formation from a plurality of different logging tools; and
determining values for a set of parameters for the plurality of locations in the geological formation by inversion of the formation data, wherein the inversion of the formation data that determines a set of parameters for each particular location in the geological formation is constrained by certain formation data that characterizes the particular location as obtained from at least one of the plurality of different logging tools, wherein the plurality of different logging tools includes a dielectric logging tool;
the formation data includes dielectric data that characterizes each particular location in the geological formation as obtained from the dielectric logging tool;
the set of parameters for each particular location in the geological formation includes an apparent cementation factor $m_n$ and a formation water saturation $S_w$ that are derived by inverting the dielectric data obtained from the dielectric logging tool;
using the apparent cementation factor $mn_n$, the formation water saturation $S_w$, and a formation porosity $\phi$ for the plurality of locations to determine an estimation of at least one of a cementation exponent m and a saturation exponent n of the geological formation; and
using the apparent cementation factor $m_n$ based at least in part on measurements in an invaded zone to estimate virgin zone water saturation and drilling into the virgin zone based at least in part on the estimated water saturation of the virgin zone estimated using the apparent cementation factor $mn_n$.

21. The method of claim 20, wherein:
the dielectric data characterizes relative permittivity and conductivity at the particular location in the geological formation.

22. The method of claim 20, wherein:
the plurality of different logging tools includes at least one of a resistivity logging tool and a porosity logging tool; and
the certain formation data that is used to constrain the inversion includes at least one of resistivity data obtained from the resistivity logging tool and porosity data obtained from the porosity logging tool.

23. The method of claim 22, wherein:
the certain formation data that is used to constrain the inversion includes resistivity data obtained from the resistivity logging tool, wherein the resistivity data characterizes DC resistance of the particular location in the geological formation.

24. The method of claim 22, wherein:
the certain formation data that is used to constrain the inversion includes porosity data obtained from the porosity logging tool, wherein the porosity data characterizes total porosity of the particular location in the geological formation.

25. The method of claim 20, wherein using the cementation factor $m_n$ to estimate the virgin zone water saturation comprises using the cementation exponent m and the saturation exponent n to estimate virgin zone water saturation according to $\sigma = \phi^m S_w^n \sigma_w$, where $\sigma$ is a measured conductivity of partially saturated rock at the plurality of locations and $\sigma_w$ is the direct current conductivity of water at the plurality of locations.

26. The method of claim 20, wherein determining the value for the apparent cementation factor $m_n$ comprises using a measurement of conductivity at a DC limit.

27. A method for characterizing a porous medium, the method comprising:
determining values for a set of parameters that characterize the porous medium by inversion of data obtained from a plurality of different tools, wherein the inversion of the data that determines the set of parameters is constrained by certain data that characterizes the porous medium as obtained from at least one of the plurality of different tools, wherein the plurality of different tools includes a dielectric logging tool;
the data includes dielectric data that characterizes each particular location in a geological formation as obtained from the dielectric logging tool;
the set of parameters for each particular location in the geological formation includes an apparent cementation factor $m_n$ and a formation water saturation $S_w$ that are derived by inverting the dielectric data obtained from the dielectric logging tool;
using the apparent cementation factor $mn_n$, the formation water saturation $S_w$, and a formation porosity $\phi$ for each particular location to determine an estimation of at least one of a cementation exponent m and a saturation exponent n of the geological formation; and
using the apparent cementation factor $m_n$ based at least in part on measurements in an invaded zone to estimate virgin zone water saturation and drilling into the virgin zone based at least in part on the estimated water saturation of the virgin zone estimated using the apparent cementation factor $m_n$.

28. The method of claim 27, wherein:
the dielectric data characterizes relative permittivity and conductivity of the porous medium.

29. The method of claim 27, wherein:
the certain data that is used to constrain the inversion includes at least one of resistivity data obtained from a resistivity tool and porosity data obtained from a porosity tool.

30. The method of claim 27, wherein:
the porous medium is reservoir rock.

31. The method of claim 27, wherein:
the plurality of different tools comprises a plurality of downhole logging tools.

32. The method of claim 27, wherein:
the plurality of different tools comprises a plurality of laboratory tools.

33. The method of claim 27, wherein using the cementation factor $m_n$ to estimate the virgin zone water saturation comprises using the cementation exponent m and the saturation exponent n to estimate virgin zone water saturation according to a $\sigma = \phi^m S_w^n \sigma_w$, where $\sigma$ is a measured conductivity of partially saturated rock at a plurality of locations and $\sigma_w$ is the direct current conductivity of water at the plurality of locations.

\* \* \* \* \*